US009624128B1

(12) United States Patent
Click et al.

(10) Patent No.: US 9,624,128 B1
(45) Date of Patent: Apr. 18, 2017

(54) GLASS CONTAINER COATING AND SURFACE TREATMENT PROCESS

(71) Applicant: Owens-Brockway Glass Container Inc., Perrysburg, OH (US)

(72) Inventors: Carol A Click, Corning, NY (US); Michael P Remington, Jr., Toledo, OH (US)

(73) Assignee: Owens—Brockway Glass Container Inc., Perrysburg, OH (US)

( * ) Notice: Subject to any disclaimer, the term of this patent is extended or adjusted under 35 U.S.C. 154(b) by 173 days.

(21) Appl. No.: 14/276,579

(22) Filed: May 13, 2014

(51) Int. Cl.
*C03C 17/38* (2006.01)
*C03C 23/00* (2006.01)
*B65D 25/14* (2006.01)

(52) U.S. Cl.
CPC .......... *C03C 23/0065* (2013.01); *B65D 25/14* (2013.01); *C03C 17/38* (2013.01); *C03C 2217/479* (2013.01); *C03C 2217/70* (2013.01); *C03C 2218/32* (2013.01)

(58) Field of Classification Search
None
See application file for complete search history.

(56) References Cited

U.S. PATENT DOCUMENTS 4,493,722 A * 1/1985 Ono .................... C03B 9/1932 65/232
4,731,254 A * 3/1988 Heineken ............... C03B 29/02 219/121.64
4,872,896 A 10/1989 LaCourse et al.
5,827,345 A 10/1998 Boaz et al.
6,238,738 B1 * 5/2001 McCurdy ........... C03C 17/2453 427/166
6,408,649 B1 6/2002 Sklyarevich et al.
6,607,800 B1 * 8/2003 Brandt ................. B44C 1/1712 40/299.01
7,282,260 B2 10/2007 LeGrande et al.
7,612,138 B2 11/2009 Kuznetsov et al.
2004/0221615 A1 * 11/2004 Postupack ............ C03C 21/002 65/30.14
2005/0118367 A1 * 6/2005 Gantenbrink ...... B65D 39/0047 428/34.4
2010/0062178 A1 3/2010 Zhang et al.
2011/0226786 A1 9/2011 Remington, Jr. et al.

FOREIGN PATENT DOCUMENTS

DE 2816171 A1 10/1979

* cited by examiner

*Primary Examiner* — Lisa Herring

(57) ABSTRACT

A glass container that includes a microwave susceptor coating on an exterior surface thereof, and a process for healing flaws in an exterior portion of the glass container. When the glass container is exposed to microwave radiation, the microwave susceptor coating generates heat and selectively and locally provides a major portion of such heat to regions of glass in the exterior portion of the glass container that are in close proximity to the flaws. These regions of glass in the exterior portion of the glass container may be selectively and locally heated so that the glass therein can flow and thereby fill-in the flaws in the exterior portion of the glass container. This process can be used to heal flaws in an exterior portion of a glass container without impairing the structural integrity of the glass container.

18 Claims, 2 Drawing Sheets

GLASS CONTAINER COATING AND SURFACE TREATMENT PROCESS

The present disclosure is directed to glass containers, and, more particularly, to coatings for glass containers and surface treatment processes for glass containers.

BACKGROUND AND SUMMARY OF THE DISCLOSURE

Various processes have been developed to repair or prevent the occurrence of scratches, nicks, cracks, or other similar flaws on surfaces of glass articles, e.g., glass containers, bottles, jars, and the like. In the glass container industry, one or more protective coatings are conventionally applied to the exterior surfaces of the glass containers during the manufacturing process to prevent or reduce the occurrence of flaws on the surfaces of the containers. More specifically, in a conventional glass container manufacturing process, the glass containers are typically coated with metal oxides, e.g., oxides of tin, titanium, vanadium, or zirconium at a "hot end" of the process with respect to an annealing lehr, and are coated again with an organic coating material at a "cold end" of the process with respect to the annealing lehr. U.S. patents that illustrate coating processes of this type include: U.S. Pat. Nos. 3,323,889; 3,407,085; 3,414,429; 3,418,154; 3,425,859; 3,445,269; 3,498,825; 3,554,787; and 3,598,632.

A general object of the present disclosure, in accordance with one aspect of the disclosure, is to provide a glass container having a microwave susceptor coating formed on an exterior surface thereof, and a surface treatment process for the coated glass container that can be used to fill-in or "heal" flaws on the exterior surface of the glass container.

The present disclosure embodies a number of aspects that can be implemented separately from or in combination with each other.

A process for healing one or more surface flaws in an exterior portion of a glass container that includes in accordance with one aspect of the disclosure includes: (a) forming a microwave susceptor coating on an exterior surface of the glass container, (b) exposing the glass container to microwave radiation to selectively and locally heat and melt one or more regions of glass in the exterior portion of the glass container, and (c) terminating said step (b) such that the one or more regions of glass in the exterior portion of the glass container are quenched and cooled by glass beneath the one or more regions.

In accordance with another aspect of the disclosure, there is provided a process for manufacturing a glass container that includes: (a) forming a glass substrate that defines the shape of the glass container, (b) forming a microwave susceptor coating on an exterior surface of the glass substrate, (c) exposing the glass container to microwave radiation to selectively and locally heat and melt at least one region of glass in an exterior portion of the glass substrate to a temperature above 500 degrees Celsius, while also maintaining a remaining portion of the glass substrate at a temperature below 500 degrees Celsius, (d) annealing the glass container, and (e) forming a cold end coating over the microwave susceptor coating on the exterior surface of the glass substrate.

In accordance with yet another aspect of the disclosure, there is provided a glass container that includes: a glass substrate and a microwave susceptor coating formed on the exterior surface of the glass substrate. The glass substrate defines the shape of the glass container and provides the container with a closed base at an axial end of the container, a body extending axially from the base and being circumferentially closed, and an open mouth at another axial end of the glass container opposite the base. The glass substrate has one or more surface flaws that extend from the exterior surface of the substrate, into an exterior portion of the substrate. The microwave susceptor coating is formed on the exterior surface of the glass substrate such that one or more local regions of the coating extend from the exterior surface of the substrate and into the exterior portion of the substrate.

BRIEF DESCRIPTION OF THE DRAWING

The disclosure, together with additional objects, features, advantages and aspects thereof, will be best understood from the following description, the appended claims and the accompanying drawings, in which:

DETAILED DESCRIPTION

Figure 1:
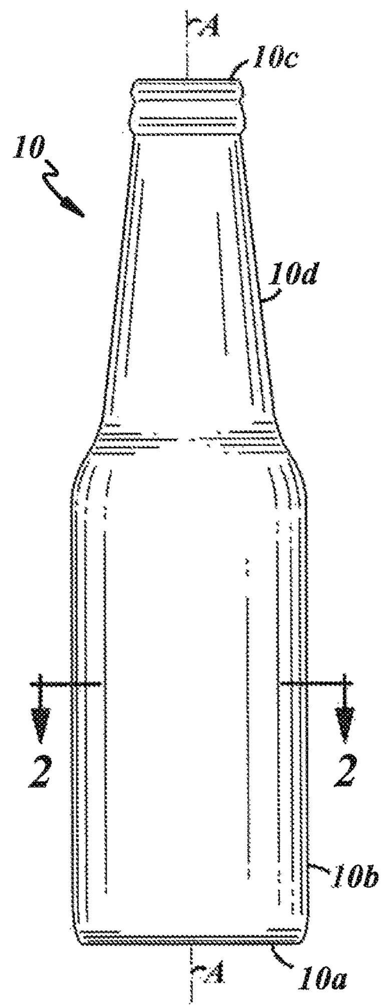
FIG. 1 is a side elevation view of a glass container, in accordance with one illustrative embodiment of the present disclosure.

FIG. 1 illustrates a glass container 10 in accordance with one embodiment of the present disclosure. The glass container 10 includes a longitudinal axis A, a closed base 10*a* at one axial end of the container 10, a body 10*b* extending in an axial direction from the closed base 10*a*, and an open mouth 10*c* at another axial end of the container 10 opposite of the base 10*a*. Accordingly, the glass container 10 is hollow. In the illustrated embodiment, the container 10 also includes a neck 10*d* that may extend axially from the body 10*b*, may be generally conical in shape, and may terminate in the mouth 10*c*. However, the container 10 need not include the neck 10*d* and the mouth 10*c* may terminate the body 10*b*, such as in a glass jar embodiment or the like. The body 10*b* may be of any suitable shape in cross-section transverse to the axis A as long as the body 10*b* is circumferentially closed.

Figure 2:
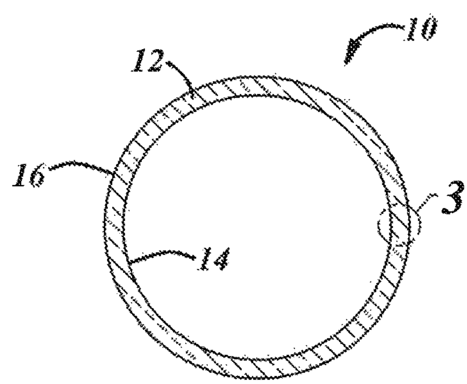
FIG. 2 is a cross-sectional view of a body portion of the glass container taken, along line 2-2 of FIG. 1.

As illustrated in FIG. 2, the container 10 includes a glass substrate 12 having an interior surface 14 and an exterior surface 16. The glass substrate 12 may be made of an inorganic silica-based glass, such as soda-lime-silica glass, borosilicate glass, or aluminosilicate glass, and may have a thickness, measured from the interior surface 14 to the exterior surface 16, or vice versa, in the range of one millimeter to five millimeters, including all ranges and subranges therebetween.

Figure 3:
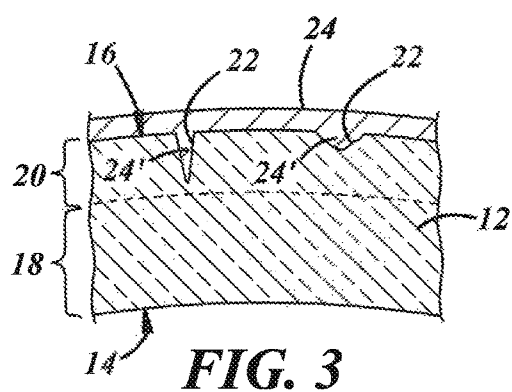
FIGS. 3-5 are different cross-sectional views of a body portion of a glass container taken during different stages of a surface treatment process, in accordance with one illustrative embodiment of the present disclosure.

As illustrated in FIG. 3, the glass substrate 12 also includes an interior portion 18 that extends along the interior surface 14 and an exterior portion 20 that extends along the exterior surface 16 of the substrate 12.

In the embodiment illustrated in FIG. 3, the exterior surface 16 of the substrate 12 is rough or uneven, and includes flaws or depressions 22 that extend from the exterior surface 16 of the substrate 12 into the exterior portion 20 of the substrate 12. These depressions 22 may have been formed in the substrate 12 during the glass container manufacturing process, for example, if the container 10 was brought into contact with another container during any of the filling, handling, inspection, packaging, or shipping stages of the process, or the depressions 22 may have been formed in the substrate 12 during consumer use of the container 10. In either case, the depressions 22 on the exterior surface 16 of the substrate 12 may extend into the exterior portion 20 at a depth of between 0.1-1 micrometers.

The glass substrate 12 illustrated in FIG. 3 also includes a microwave susceptor coating 24 that has been formed on the exterior surface 16 of the substrate 12. The microwave susceptor coating 24 is formed on the exterior surface 16 of the substrate 12 such that certain local regions 24' of the coating 24 extend from the exterior surface 16 of the substrate and permeate, fill-in, or partially migrate into the depressions 22 in the substrate. As such, the concentration and volume of the coating 24 in these local regions 24' is relatively large, as compared to the concentration and volume of the coating 24 that is formed over other areas of the substrate 12 that are free from depressions and thus are relatively smooth.

The microwave susceptor coating 24 may have a thickness in the range of about 50-500 nanometers, including all ranges and subranges therebetween. However, the local regions 24' of the coating 24 that extend from the exterior surface 16 into the depressions 22 in the substrate 12 may result in the coating 24 being locally thicker, by up to about one micrometer in thickness, in the local regions 24' where the coating 24 has filled-in or permeated into the depressions 22 in the substrate 12.

The microwave susceptor coating 24 includes a material that couples well with microwave energy, i.e., a microwave susceptor material. In particular, the microwave susceptor material in the coating 24 is formulated to absorb microwave energy and convert the microwave energy into heat at temperatures in the range of 500 degrees Celsius to 750 degrees Celsius, including all ranges and subranges therebetween. Examples of some suitable microwave susceptor materials include aluminum (Al), nickel (Ni), antimony (Sb), copper (Cu), molybdenum (Mo), iron (Fe), chromium (Cr), zinc (Zn), silver (Ag), gold (Au), silicon carbide (SiC), and mixtures or alloys thereof.

The susceptor material in the microwave susceptor coating 24 may be a nanomaterial, and may include nanoparticles having an average maximum dimension smaller than 100 nanometers. For example, the susceptor material may include a plurality of nanoparticles having a mean particle diameter in the range of 10-100 nanometers. Examples of other suitably shaped nanomaterials include, e.g., nanospheres, nanotubes, nanowires, nanoflakes, nanorods, and nanofibers, to name a few.

Accordingly, when the microwave susceptor coating 24 is exposed to microwave radiation, the coating 24 absorbs a portion of the electromagnetic energy and generates heat. The heat generated in the coating 24 is then transferred to the exterior portion 20 of the substrate 12 due to the close proximity of the coating 24 and the exterior portion 20. However, because the local regions 24' of the coating 24 that extend from the exterior surface 16 of the substrate 12 into the depressions 22 are relatively thick, as compared to the remaining regions of the coating 24, the glass in the exterior portion 20 of the substrate 12 that surrounds these local regions 24' will be selectively and locally heated to a greater extent than the rest of the glass within the substrate.

Figure 4:
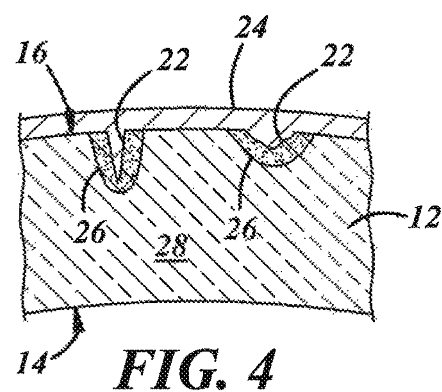

For example, as illustrated in FIG. 4, the microwave susceptor coating 24 can be exposed to microwave radiation such that the coating 24 generates heat and selectively and locally provides a significant amount of such heat to certain regions 26 of glass within the substrate 12 that are in close proximity to the depressions 22, without heating the glass within a remaining portion 28 of the substrate 12 to a corresponding degree. In particular, the microwave susceptor coating 24 can be used to selectively and locally heat the regions 26 of glass within the exterior portion 20 of the substrate 12 that are in close proximity to the depressions 22 to a sufficient temperature for the glass within those regions 26 to flow and thereby fill-in or "heal" the depressions 22 in the substrate 12, without impairing the overall structural integrity of the substrate.

Figure 5:
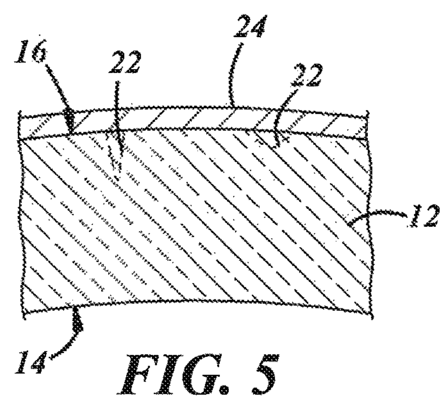

As illustrated in FIG. 5, after the depressions 22 in the substrate 12 have been filled-in by the selective and local application of heat to the surrounding regions 26 of glass, the exterior surface 16 of the substrate 12 will be restored to a relatively smooth state. The dashed lines in FIG. 5 represent the former locations of the depressions 22 in the substrate 12.

In the embodiments illustrated in FIGS. 3-5, the microwave susceptor coating 24 is formed directly on the exterior surface 16 of the glass substrate 12. In this arrangement, the microwave susceptor coating 24 may be used in place of a conventional hot end coating. That is, the container 10 may be free of a conventional hot end coating.

In other embodiments, the microwave susceptor coating 24 may be formed on the exterior surface 16 of the glass substrate 12 over one or more different coatings already present on the glass substrate 12. For example, the microwave susceptor coating 24 may be formed on the exterior surface 16 of the glass substrate 12 over a conventional hot end coating that has been applied to the exterior surface 16 of the glass substrate 12 after formation of the substrate 12, but before the substrate 12 has been annealed. In this example, the microwave susceptor coating 24 may be used in place of a conventional cold end coating. That is, the container 10 may be free of a conventional cold end coating. As another example, the microwave susceptor coating 24 may be formed on the exterior surface 16 of the glass substrate 12 over both a conventional hot end coating and a conventional cold end coating. In such case, the microwave susceptor coating 24 may be formed on the exterior surface 16 of the glass substrate 12 after the substrate 12 has been annealed.

Although not shown in the drawings, one or more different coatings may be formed on the exterior surface 16 of the glass substrate 12 over the microwave susceptor coating 24. For example, a conventional cold end coating may be formed on the exterior surface 16 of the glass substrate 12 over the microwave susceptor coating 24.

The one or more different coatings on the exterior surface 16 of the glass substrate 12 may be formed as adjacent layers overlying one another sequentially, or one or more of the coatings may penetrate into or even through one or more of the other coatings. Accordingly, the various coatings may be fairly described as being applied generally to the glass container 10, regardless of how or to what extent any given coating contacts any of the other coatings and/or the substrate 12. Similarly, when a material is described as being applied to the exterior surface 16 of the glass container 10, the material may be applied over one or more coatings and/or to the glass substrate 12 itself.

The glass container 10 may be produced in any suitable manner. A typical glass container manufacturing process includes a "hot end," where molten glass is prepared and formed into glass containers, and a "cold end," where the glass containers are inspected and packaged. After the glass containers are formed, but before the containers are inspected and packaged, the containers are annealed, for example, in an annealing lehr.

Figure 6:
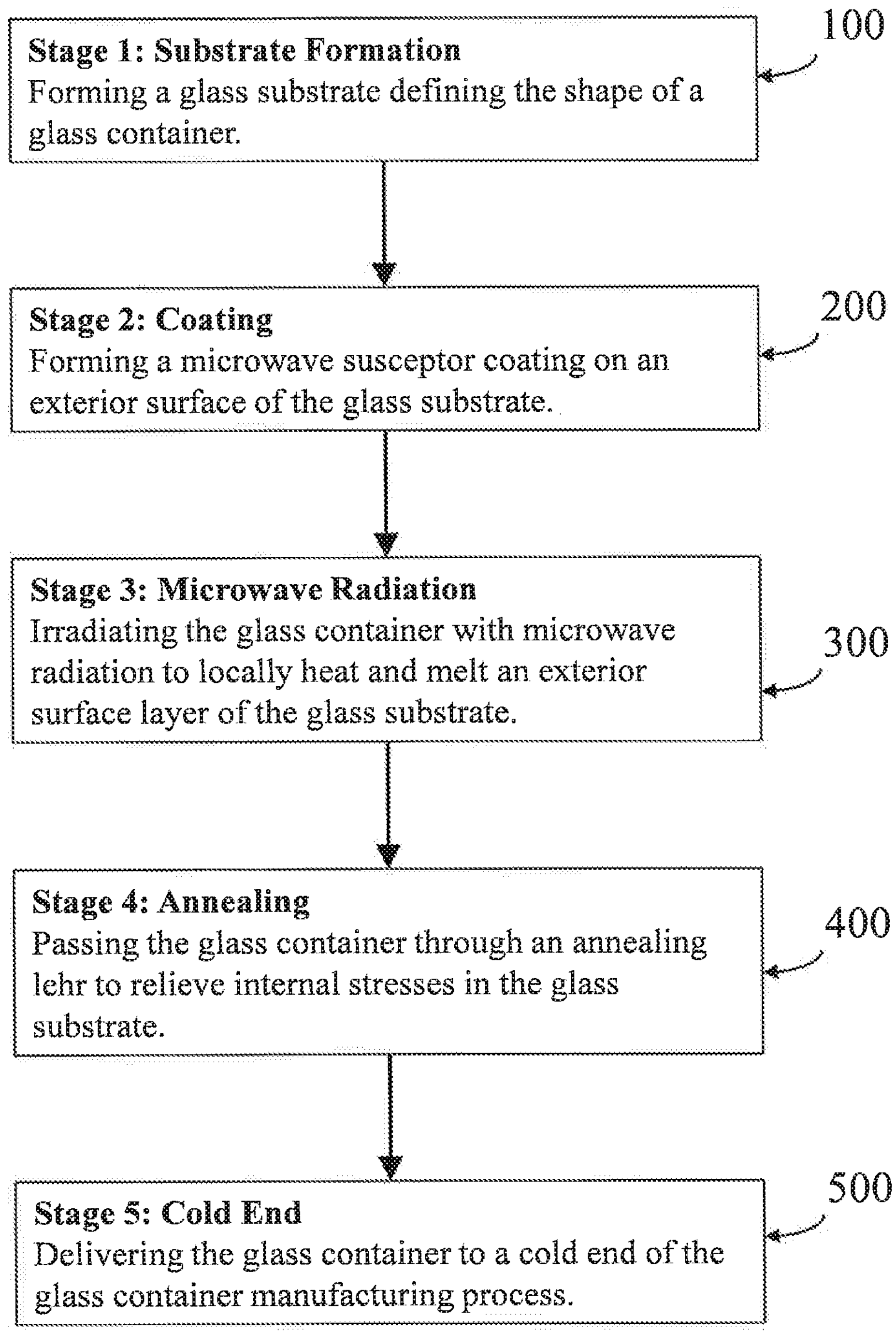
FIG. 6 is a block diagram of a process for manufacturing a glass container in accordance with an illustrative embodiment of the present disclosure.

FIG. 6 illustrates a process for producing the glass container 10 in accordance with one embodiment of the present disclosure. A first stage 100 of the process includes forming a glass substrate 12 that defines the shape of the glass container 10.

The microwave susceptor coating 24 is formed on the glass substrate 12 in a second stage 200 of the process. The microwave susceptor coating 24 may be formed on the exterior surface 16 of the glass substrate 12 at any suitable point within the glass container production process. In the embodiment illustrated in FIG. 4, the microwave susceptor coating 24 is formed on the exterior surface 16 of the glass substrate 12 after the glass substrate 12 has been formed, but before the glass container 10 is annealed. In other embodiments, the microwave susceptor coating 24 may be formed on the exterior surface 16 of the glass substrate 12 after the glass container 10 has been annealed.

The microwave susceptor coating 24 may be formed on the glass substrate 12 by depositing or applying a precursor coating material onto the exterior surface 16 of glass substrate 12. Thereafter, the precursor coating material may be heated to cure the precursor coating material and thereby transform the precursor coating material into the microwave susceptor coating 24. In other embodiments, the glass substrate 12 may already be at an elevated temperature when the precursor coating is applied, and the temperature of the glass substrate itself may be sufficient to cure the precursor coating material as it is applied to the exterior surface 16.

The precursor coating material may be deposited or applied to the exterior surface 16 of the glass substrate 12 by any suitable method. For example, the precursor coating material may be deposited or applied to the exterior surface 16 of the glass substrate 12 using a wet chemical coating process or a chemical vapor deposition process. If a wet chemical coating process is used, the precursor coating material may be in the form of a solution or dispersion that includes a susceptor material dissolved or dispersed within a solvent. In such case, the precursor coating material may be physically deposited on the exterior surface 16 of the glass substrate 12, for example, using a spray, dip, roller, or flow coating process. Examples of some suitable solvents that may be used to prepare the precursor coating material include toluene, pentane, heptane, mineral spirits, and/or a glycol ether. The susceptor material may constitute between 1 wt. % and 20 wt. % of the precursor coating material, including all ranges and subranges therebetween.

The precursor coating material may be deposited on the exterior surface 16 of the glass substrate 12 at any suitable temperature, including room temperature, or temperatures above or below room temperature. In embodiments where the precursor coating material is deposited on the exterior surface 16 of the glass substrate 12 after the glass container 10 is formed but before the glass container is annealed, the glass substrate 12 may be at a temperature in the range of 400 degrees Celsius to 550 degrees Celsius, including all ranges and subranges therebetween. On the other hand, if the precursor coating material is deposited onto the exterior surface 16 of the glass substrate 12 after annealing, the glass substrate 12 may be at a temperature of between 20 degrees Celsius and 200 degrees Celsius, including all ranges and subranges therebetween. In embodiments where the glass substrate 12 is at a temperature below 50 degrees Celsius when the precursor coating material is applied thereto, the glass substrate 12 and/or the precursor coating material may need to be heated to a temperature in excess of 100 degrees Celsius to cure the precursor coating material and thereby transform the precursor coating material into the microwave susceptor coating 24.

In a third stage 300 of the process, the glass container 10 is exposed to microwave radiation to selectively and locally heat regions 26 of glass within the substrate 12 that are in close proximity to the depressions 22. In particular, the regions 26 of glass proximate to the depressions 22 in the substrate 12 are selectively and locally heated in this stage of the process to a sufficient temperature for the glass within the regions 26 to locally melt and flow so that the depressions 22 in the exterior portion 20 of the substrate 12 can be filled-in by the flowing molten glass. This may require the regions 26 of glass proximate to the depressions 22 in the substrate 12 to be selectively and locally heated to temperatures greater than 500 degrees Celsius. For example, it may be desirable to heat the regions 26 of glass proximate to the depressions 22 in the substrate 12 to a temperature above the melting or softening point of the substrate 12, e.g., to a temperature in the range of 600 degrees Celsius to 750 degrees Celsius, including all ranges and subranges therebetween.

At the same time, however, the remaining portion 28 of the substrate 12 is maintained at a relatively low temperature during the entire microwave radiation stage 300, e.g., at a temperature less than 500 degrees Celsius. By maintaining the remaining portion 28 of the substrate 12 at such a low temperature during this stage 300, the depressions 22 in the substrate 12 can be "healed" without impairing the structural integrity of the overall glass container 10. In some embodiments, it may be desirable to maintain the remaining portion 28 of the glass substrate 12 at a temperature in the range of 150 degrees Celsius to 400 degrees Celsius, including all ranges and subranges therebetween.

The selective and localized heating and melting of the regions 26 of glass proximate to the depressions 22 in the substrate 12 is accomplished by forming the coating 24 such that the coating 24 permeates, fills-in, or partially migrates into the depressions 22 in the substrate 12. This results in a relatively large concentration and volume of the coating 24 being formed over and within the depressions 22 in the substrate 12 than is formed over the remaining areas of the substrate 12. In addition, this results in a relatively large portion of the coating 24 being formed near the regions 26 of glass in the substrate 12 that are close to the depressions 22 in the substrate 12, as compared to the amount of the coating 24 that is formed over the remaining areas of the substrate. Therefore, when the glass container 10 is exposed to microwave radiation, the relatively high concentration and volume of the coating 24 near the regions 26 of glass proximate to the depressions 22 causes the glass within those regions 26 to be selectively and locally heated to a temperature that is higher than the rest of the substrate.

As used herein, the term "microwave radiation" generally includes electromagnetic energy having wavelengths in the range of about 0.3 centimeters (cm) to about 30 cm, and corresponding to frequencies of about 0.9 gigahertz (GHz) to about 100 GHz, including all ranges and subranges between these ranges.

The amount of heat generated by the susceptor material in the microwave susceptor coating 24 will depend on the frequency of the microwave radiation and upon the duration of exposure. In some embodiments, it may be desirable to expose the glass container 10 to microwave radiation such that the microwave susceptor coating 24 reaches a temperature in the range of 550 degrees Celsius to 750 degrees Celsius, including all ranges and subranges therebetween. This may involve exposing the glass container 10 to microwave radiation for a duration of between 5 seconds and 30 seconds, including all ranges and subranges therebetween.

To help maintain the temperature of the remaining portion 28 of the glass substrate 12 at a relatively low temperature during the microwave radiation stage 300, the glass substrate 12 may be cooled to a suitably low temperature before the glass container 10 is exposed to microwave radiation. For example, the glass substrate 12 may be cooled to a temperature in the range of 150 degrees Celsius to 400 degrees Celsius, including all ranges and subranges therebetween, prior to initiating the third stage 300 of the process. In addition, the temperature of the remaining portion 28 of the glass substrate 12 may be kept at a suitably low temperature by terminating the microwave radiation stage 300 before the remaining portion 28 reaches or exceeds a predefined temperature. For example, it may be desirable to terminate the microwave radiation stage 300 before the remaining portion 28 reaches a temperature of about 250 degrees Celsius. By maintaining the remaining portion 28 of the glass substrate 12 at a relatively low temperature during the microwave radiation stage 300, the selectively and locally heated regions 26 in the glass substrate 12 may be quenched and cooled by the remaining portion 28 of the substrate 12 once the microwave radiation has stopped.

The glass container 10 may be annealed in a fourth stage 400 of the process after completion of the microwave radiation stage 300. The glass container 10 may be annealed by being passed through an annealing lehr, where it may be heated to a temperature in the range of about 500 degrees Celsius to 550 degrees Celsius, including all ranges and subranges therebetween, and then cooled slowly to remove any stress points that may have developed in the glass substrate 12. For example, the glass container 10 may be annealed after completion of stage 300 to relieve any stress points that may have been produced in the glass container 10 during the selective and localized heating of the one or more regions in the exterior portion 20 of the glass substrate 12.

Thereafter, in a fifth stage 500 of the process, the glass container 10 may be delivered to the cold end of the manufacturing process. One or more cold end coatings may be applied to the glass container 10 over the microwave susceptor coating 24 in this stage of the process. In addition, the glass container 10 may be inspected at the cold end of the manufacturing process for commercial variations, sorted, labeled, packaged and/or stored for further processing.

There thus has been disclosed a microwave susceptor coating for a glass container and a surface treatment process for a glass container, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A surface treatment process for a glass container that includes:

(a) forming a microwave susceptor coating on an exterior surface of a glass container;

(b) exposing the glass container to microwave radiation to selectively and locally heat and melt one or more regions of glass in an exterior portion of the glass container while maintaining glass beneath the one or more regions at a temperature below 500 degrees Celsius; and (c) terminating said step (b) such that the one or more regions of glass in the exterior portion of the glass container are quenched and cooled by glass beneath the one or more regions, wherein said step (c) is carried out before glass beneath the one or more regions reaches a temperature of 250° C.

2. The process set forth in claim 1 wherein the microwave susceptor coating is formed in said step (a) such that one or more local regions of the coating extend from the exterior surface of the glass container into the exterior portion of the glass container.

3. The process set forth in claim 1 wherein the microwave susceptor coating is formed in said step (a) such that one or more local regions of the coating at least partially fill-in or migrate into one or more surface flaws in the exterior portion of the glass container.

4. The process set forth in claim 3 wherein the microwave susceptor coating has a thickness, and wherein the one or more local regions of the coating result in the coating being locally thicker by up to one micrometer in thickness in the local regions.

5. The process set forth in claim 1 wherein said step (b) includes selectively and locally heating and melting one or more regions of glass in the exterior portion of the glass container that are proximate to one or more surface flaws in the exterior portion of the glass container.

6. The process set forth in claim 1 wherein said step (b) includes exposing the glass container to microwave radiation such that heat is locally generated in the microwave susceptor coating, with a major portion of the heat being generated near the one or more regions of glass in the exterior portion of the glass container.

7. The process set forth in claim 1 wherein said step (b) includes exposing the glass container to microwave radiation having a frequency in the range of 0.9 GHz to 100 GHz.

8. The process set forth in claim 1 wherein said step (b) includes exposing the glass container to microwave radiation for a duration between 5 seconds and 30 seconds.

9. The process set forth in claim 1 wherein said step (b) includes selectively and locally heating the one or more regions of glass in the exterior portion of the glass container to a temperature in the range of 600 degrees Celsius to 750 degrees Celsius.

10. The process set forth in claim 1 that also includes: after said step (c), annealing the glass container.

11. The process set forth in claim 1 wherein the glass container comprises a glass substrate having a thickness in the range of 1-5 mm measured from the exterior surface to an interior surface of the glass container.

12. The process set forth in claim 1 wherein the microwave susceptor coating includes nanoparticles of a microwave susceptor material.

13. A process for healing one or more surface flaws in an exterior portion of a glass container that includes:

(a) forming a microwave susceptor coating on an exterior surface of a glass container;

(b) exposing the glass container to microwave radiation to selectively and locally heat and melt one or more regions of glass in an exterior portion of the glass container; and (c) terminating said step (b) such that the one or more regions of glass in the exterior portion of the glass container are quenched and cooled by glass beneath the one or more regions, wherein the one or more regions of glass in the exterior portion of the glass container are selectively and locally heated and melted in said step (b) while also maintaining the glass beneath the exterior portion at a temperature in the range of 150 degrees Celsius to 250 degrees Celsius.

14. A process for manufacturing a glass container that includes:

(a) forming a glass substrate that defines the shape of the glass container, (b) forming a microwave susceptor coating on an exterior surface of the glass substrate;

(c) exposing the glass container to microwave radiation to selectively and locally heat and melt at least one region of glass in an exterior portion of the glass substrate to a temperature above 500 degrees Celsius, while also maintaining a remaining portion of the glass substrate at a temperature below 500 degrees Celsius;

(d) annealing the glass container; and (e) forming a cold end coating over the microwave susceptor coating on the exterior surface of the glass substrate.

15. The process set forth in claim 14 wherein said step (b) includes:

depositing a precursor solution including a susceptor material and a solvent onto the exterior surface of the glass substrate.

16. A process for manufacturing a glass container that includes:

(a) forming a glass substrate that defines the shape of the glass container;

(b) forming a microwave susceptor coating on an exterior surface of the glass substrate;

(c) exposing the glass container to microwave radiation to selectively and locally heat and melt at least one region of glass in an exterior portion of the glass substrate to a temperature above 500 degrees Celsius, while also maintaining a remaining portion of the glass substrate at a temperature below 500 degrees Celsius;

(d) annealing the glass container; and (e) forming a cold end coating over the microwave susceptor coating on the exterior surface of the glass substrate, wherein said step (c) is terminated before glass beneath the at least one region of glass in the exterior portion of the glass substrate reaches a temperature of 250° C.

17. A surface treatment process for a glass container that includes:

(a) forming a microwave susceptor coating on an exterior surface of a glass container;

(b) exposing the lass container to microwave radiation to selectively and locally heat and melt one or more regions of lass in an exterior portion of the lass container while maintaining lass beneath the one or more regions at a temperature below 500 degrees Celsius; and (c) termination said step (b) such that the one or more regions of lass in the exterior portion of the lass container are quenched and cooled by lass beneath the one or more regions, wherein the glass container comprises a glass substrate having a thickness in the range of 1-5 mm measured from the exterior surface to an interior surface of the lass container, and wherein, prior to said step (b), the glass substrate includes one or more depressions that extend from the exterior surface into the exterior portion of the glass container at a depth in the range of 0.1-1 μm, and wherein the microwave susceptor coating is formed in said step (a) such that one or more local regions of the coating extend from the exterior surface of the glass container into the one or more depressions in the exterior portion of the glass container.

18. A surface treatment process for a lass container that includes:

(a) forming a microwave susceptor coating on an exterior surface of a glass container;

(b) exposing the glass container to microwave radiation to selectively and locally heat and melt one or more regions of glass in an exterior portion of the glass container while maintaining glass beneath the one or more regions at a temperature below 500 degrees Celsius; and (c) terminating said step (b) such that the one or more regions of glass in the exterior portion of the glass container are quenched and cooled by glass beneath the one or more regions, wherein the microwave susceptor coating has a thickness in the range of 50-500 nm.

* * * * *